(12) United States Patent
Ku

(10) Patent No.: US 9,163,609 B2
(45) Date of Patent: Oct. 20, 2015

(54) BOOMERANG WIND BLADES AND THE DEVICE THEREOF

(71) Applicant: NATIONAL PENGHU UNIVERSITY OF SCIENCE AND TECHNOLOGY, Penghu County (TW)

(72) Inventor: Fu-Neng Ku, Penghu County (TW)

(73) Assignee: National Penghu University of Science and Technology, Penghu County (TW)

( * ) Notice: Subject to any disclaimer, the term of this patent is extended or adjusted under 35 U.S.C. 154(b) by 397 days.

(21) Appl. No.: 13/753,772

(22) Filed: Jan. 30, 2013

(65) Prior Publication Data

US 2014/0212268 A1    Jul. 31, 2014

(51) Int. Cl.
*F03D 5/00*    (2006.01)

(52) U.S. Cl.
CPC ............... *F03D 5/00* (2013.01); *F05B 2250/70* (2013.01); *Y02E 10/70* (2013.01); *Y02E 10/725* (2013.01)

(58) Field of Classification Search
CPC ......... F03D 5/00; F03D 5/005; F03D 1/0675; A63B 65/08
USPC ..... 416/19, 227 R, 227 B; D21/437; 473/590
See application file for complete search history.

(56) References Cited

U.S. PATENT DOCUMENTS 4,541,637 A * 9/1985 Atkielski ...................... 473/590

FOREIGN PATENT DOCUMENTS

JP    2004316551 A  * 11/2004

* cited by examiner

*Primary Examiner* — Richard Edgar
(74) *Attorney, Agent, or Firm* — Rosenberg, Klein & Lee

(57) ABSTRACT

A boomerang wind blade includes a blade body having a protruding front edge and a recess rear edge. Both sides of the center of the blade body are two wing parts bent at an angle. The wing shape of one wing part is round at the front edge and tapering towards the rear edge. The wing shape of the other wing part is round at the rear edge and tapering towards the front edge. The device with a boomerang wind blade has a shaft fixed to the center of the two wing parts of the blade body to rotate as the blade body is driven by wind. The device also has at least one generator coupled with the shaft to generate electrical power.

2 Claims, 8 Drawing Sheets

BOOMERANG WIND BLADES AND THE DEVICE THEREOF

BACKGROUND OF THE INVENTION

1. Field of Invention

The invention relates to a wind power generator and, in particular, to a boomerang wind blades and the device thereof.

2. Related Art

The conventional wind turbine is a pillar in the combination with a generator set. The shaft of the generator set has a fan blade. When the wind blows the windward side of the fan blade, the fan blade rotates under the wind power. The shaft is driven to rotate so that the generator set for power generation.

For such conventional wind turbines, however, the fan blade rotates only when the windward side thereof is blown by wind. This means that the fan blade is only driven by wind power in a single direction. If the wind blows the fan blade from a direction other than the windward side, then the fan blade cannot be driven to achieve the power generation effect, resulting in low efficiency in wind power generation.

SUMMARY OF THE INVENTION

One objective of the invention is to solve the above problem by providing a boomerang wind blade and the device thereof. The windward direction of the wind blade includes a front edge and rear edge. Therefore, it can be driven by wind in both directions to rotate and to generate electrical power.

Another objective of the invention is to combine the wind blade with a wind blade ring, which can rotate with respect to a stator via a number of rolling elements, so that the wind blade has more directions for wind to generate power, further improving power generation efficiency.

To achieve the above-mentioned objectives, the invention comprises: a blade body, shaft, and at least one generator.

The blade body has a protruding front edge and a recess rear edge. Both sides of the center of the blade body are two wing parts. The two wing parts are bent at an angle. The shape of one wing part is round on the front edge thereof and tapering towards the rear edge. The shape of the other wing part is round on the rear edge thereof and tapering towards the front edge.

The shaft is fixed at the center of the two wing parts on the blade body. The shaft rotates with the blade body driven by wind.

The generator is coupled with the shaft, and is driven by the shaft to generate electrical power.

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein.

DETAILED DESCRIPTION OF THE INVENTION

The present invention will be apparent from the following detailed description, which proceeds with reference to the accompanying drawings, wherein the same references relate to the same elements.

Figure 1:
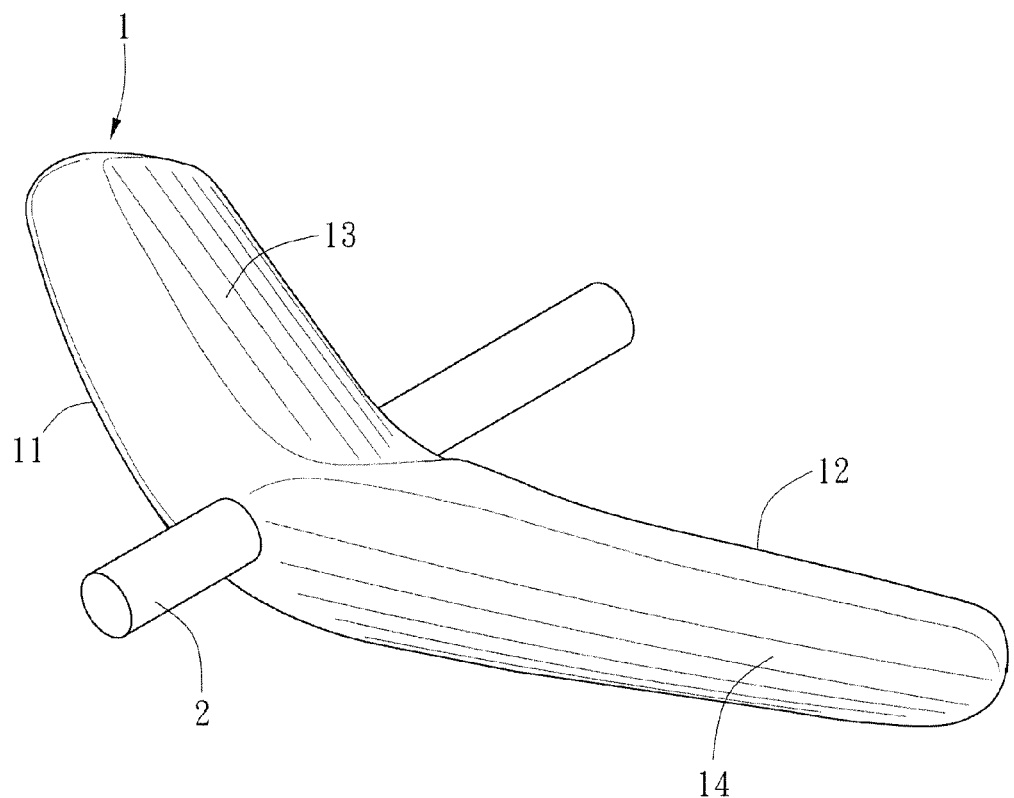
FIG. 1 is a three-dimensional view of the first embodiment of the invention.

An embodiment of the invention provides a boomerang wind blade and the device thereof. As shown in FIG. 1, the boomerang wind blade comprises a blade body L The device further comprises a shaft 2 connecting to a wind generator (not shown).

Figure 2:
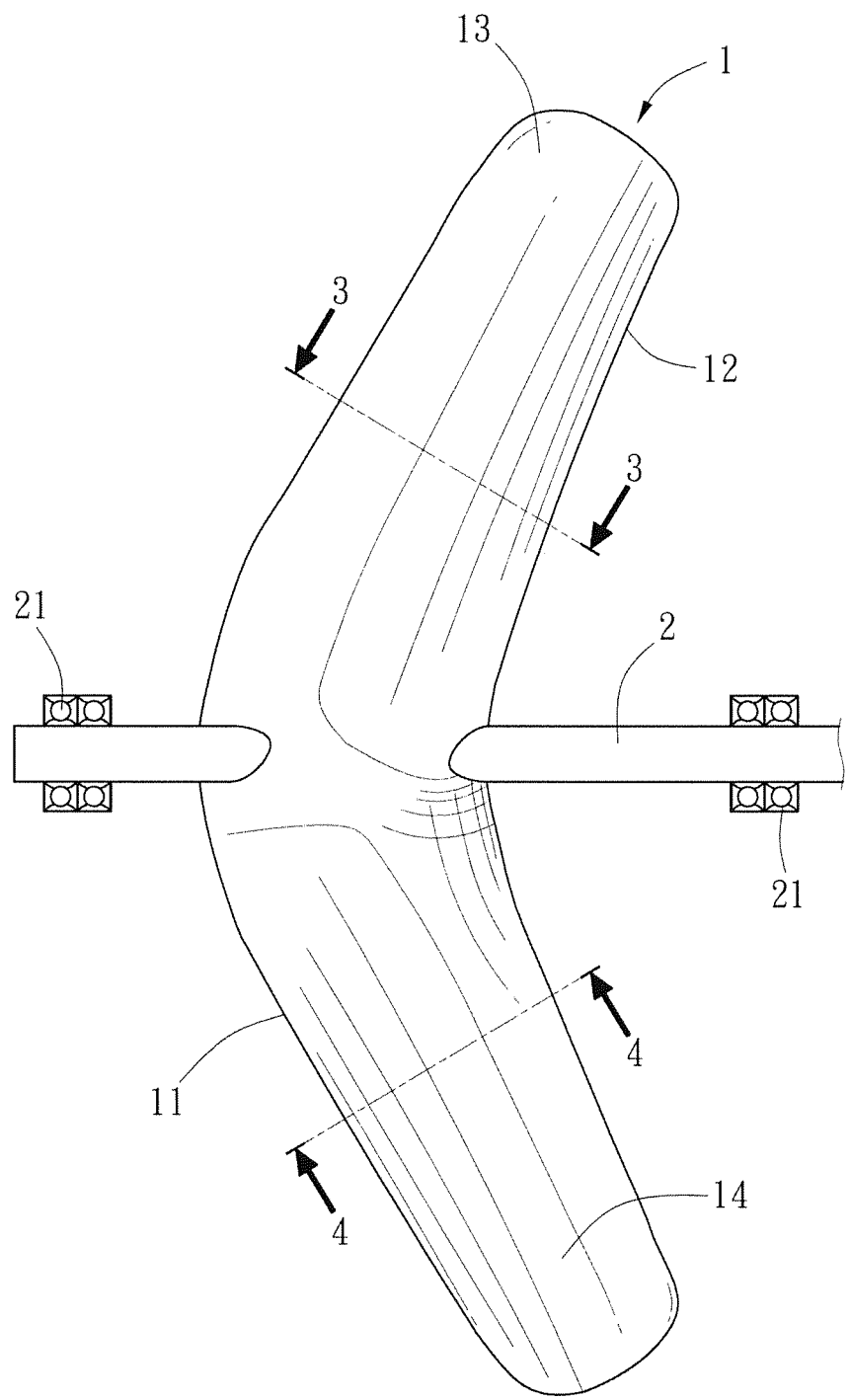
FIG. 2 is a planar structural view of the first embodiment.
Figure 3:
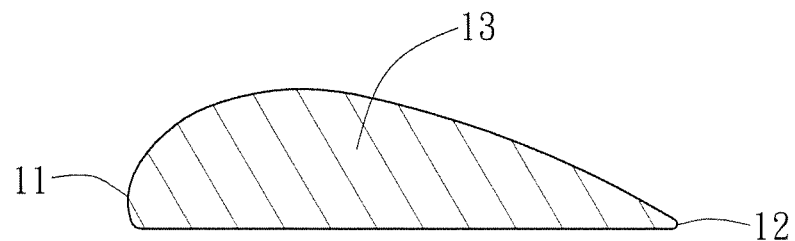
FIG. 3 is a cross-sectional view of FIG. 2 along the 3-3 line.
Figure 4:
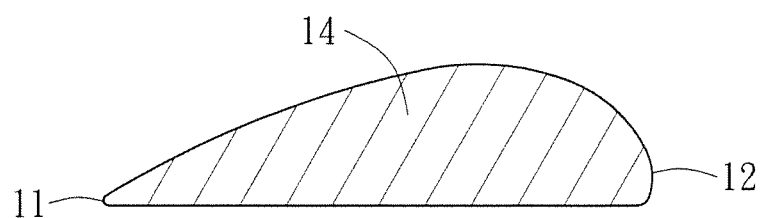
FIG. 4 is a cross-sectional view of FIG. 2 along the 4-4 line.

As shown in FIG. 2, the blade body 1 has a relatively protruding front edge 11 and a recess rear edge 12. Both sides of the center of the blade body 1 are a left wing part 13 and a right wing part 14. The left wing part 13 and the right wing part 14 are bent at an angle. The wing shape of the left wing part 13 is round at the front edge 11 and tapering towards the rear edge 12 (as shown in FIG. 3). The wing shape of the right wing part 14 is round at the rear edge 12 and tapering towards the front edge 11 (as shown in FIG. 4).

Furthermore, the shaft 2 is fixed to the center between the left wing part 13 and the right wing part 14 of the blade body L In this embodiment, it is pivotally installed in two bearings 21. It can rotate with the blade body 1 driven by wind power. The wind generator generates electrical power with the rotation of the shaft 2.

Figure 5:
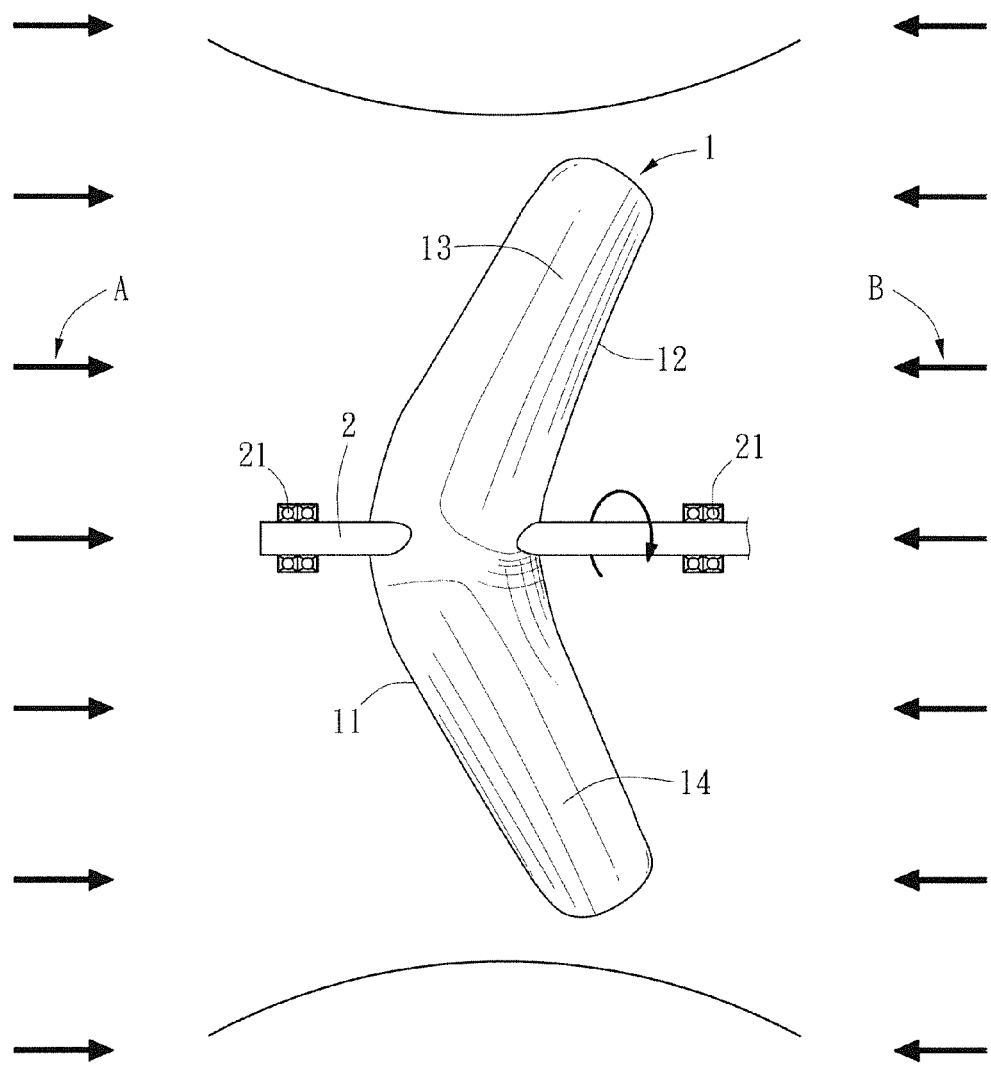
FIG. 5 is a schematic view of the first embodiment, where the blade body is driven by wind along the front edge or the rear edge to rotate.

With reference to FIG. 5, the blade body 1 in the drawing uses the front edge 11 thereof as the windward side when wind A blows from the front edge 11, its front edge 11. In this case, the blade body 1 is driven to rotate the shaft 2. If wind B blows from the rear edge 12, then the rear edge 12 becomes the windward side of the blade body L It also drives the blade body 1 to rotate the shaft 2.

It is found from the above description the following advantages of the invention. The blade body 1 of the disclosed boomerang wind blade uses both the front edge 11 and the rear edge 12 as the windward side. This is compared with the conventional wind blade of the wind power generator where only a single direction can be the windward side. When wind blows the blade body 1 from the front edge 11 or the rear edge 12, the shaft 2 can always be driven to rotate and to generate electrical power. The invention can thus enhance the efficiency of wind power generation.

Figure 6:
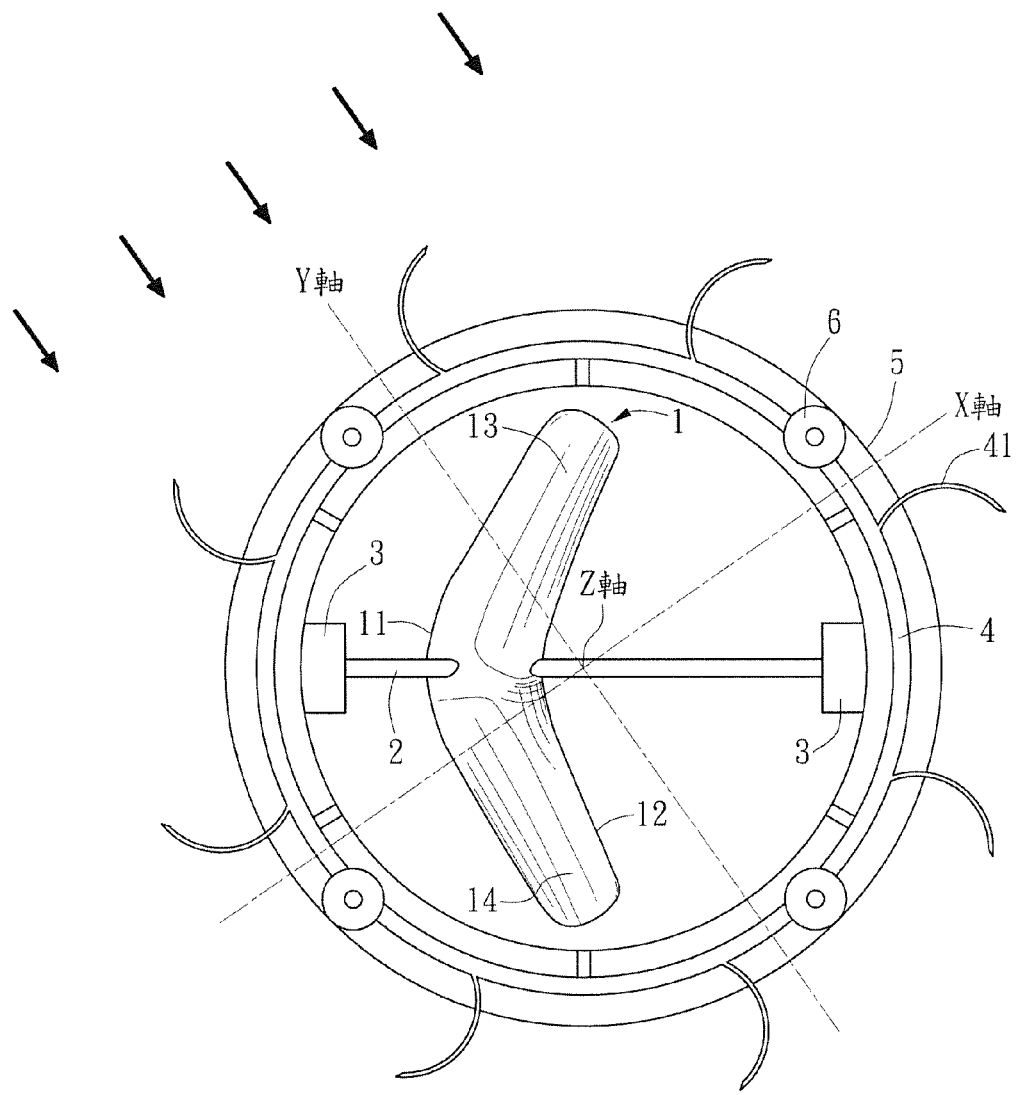
FIG. 6 is a planar structural view of the second embodiment.

Of course, the present invention still has many embodiments that differ from the previous one only in the details. Please refer to FIG. 6 for the second embodiment of the invention. Based on the first embodiment, both ends of the shaft 2 are provided with a wind power generator 3, respectively. The two wind power generators 3 are fixed to opposite sides of a wind blade ring 4. A plurality of rolling elements 6 are interposed between the wind blade ring 4 and a stator 5. The circumference of the wind blade ring 4 is extended along the radial direction with several blades 41 curving in the same direction and extending from the stator 5.

Figure 7:
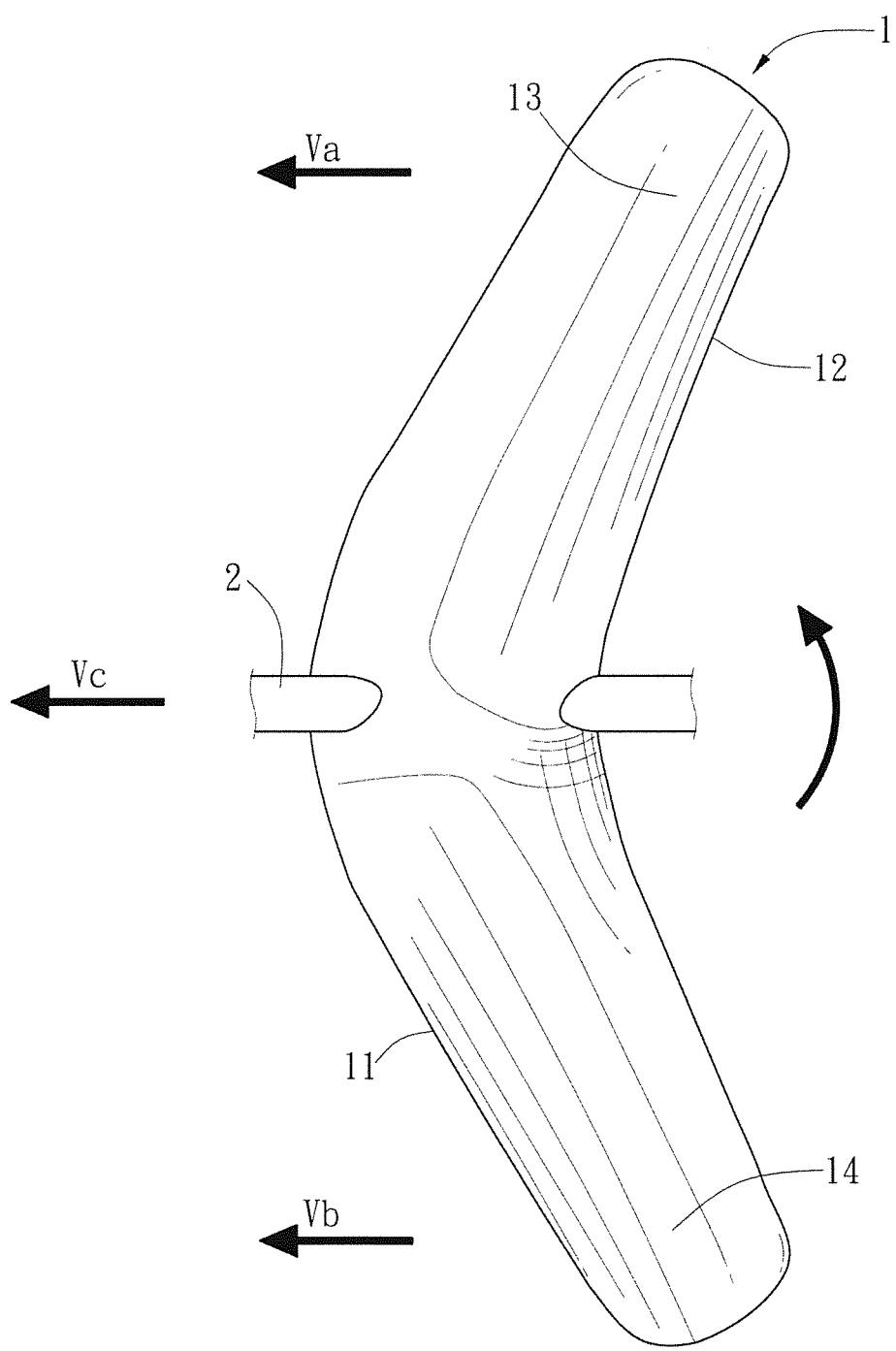
FIG. 7 is a diagram showing the dynamics of the blade body.

This embodiment mainly utilizes the gyro-mechanical principle. When wind C blows in the direction as shown in the drawing, the wind blade ring 4 rotates counterclockwise with respect to the z-axis. The blade body 1 also rotates, as shown in FIG. 7. The wind speed relative to the blade body 1 becomes the speed of center of mass $V_c$ of the blade body 1.

Figure 8:
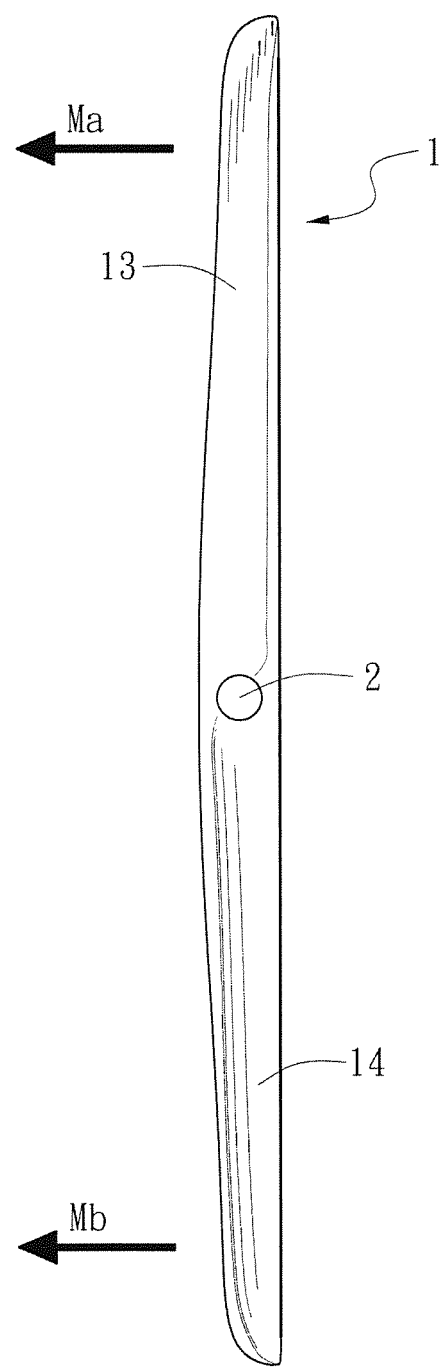
FIG. 8 is another diagram showing the dynamics of the blade body.
Figure 9:
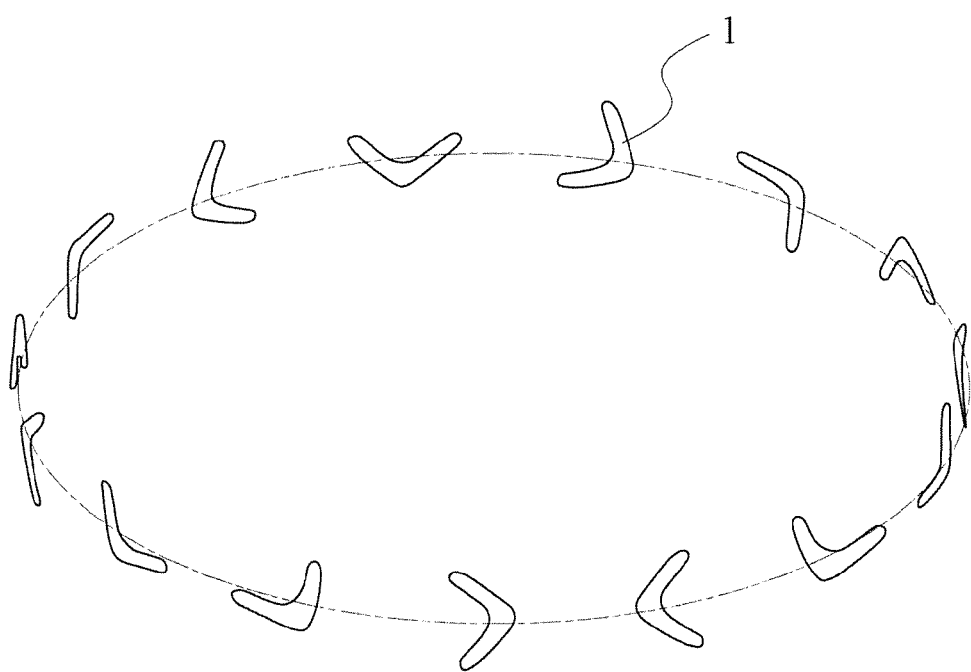
FIG. 9 shows the track of a rotating blade body in the second embodiment.

Moreover, $V_a=V_c+r\omega$, where $r\omega$ is the tangential linear speed, i.e., the product of distance r and rotation angular velocity $\omega$. Likewise, $V_b=V_c-r\omega$. Please refer to FIG. 8. The lateral force $M_a$ is greater than the lateral force $M_b$. Therefore, the blade body 1 has a torque output in the counterclockwise direction. Thus, the blade body 1 rotates relative to the shaft 2, so that the wind power generator 3 generates electrical power. When the blade body 1 rotates in the wind blade ring 4, the rotation track thereof is shown in FIG. 9.

According to the invention, the blade body 1 with the wind blade ring 4 can rotate when wind blows from different directions. The shaft 2 drives the generator 3 for power generation. The invention thus enhances the efficiency in wind power generation.

Although the invention has been described with reference to specific embodiments, this description is not meant to be construed in a limiting sense. Various modifications of the disclosed embodiments, as well as alternative embodiments, will be apparent to people skilled in the art. Therefore, it is contemplated that the appended claims will cover all modifications that fall within the true scope of the invention.

What is claimed is:

1. A device using a boomerang wind blade, comprising:
   at least one blade body having a protruding front edge and a recess rear edge, with both sides of the center thereof divided into two wing parts at an angle in between; wherein one wing shape is round at the front edge and tapering towards the rear edge, and the other wing shape is round at the rear edge and tapering towards the front edge;
   a shaft fixed to the center of the two wing parts of the blade body and driven to rotate by the blade body under wind power; and
   at least one generator coupled with the shaft to generate electrical power as the shaft rotates.

2. The device using a boomerang wind blade of claim 1, wherein both ends of the shaft are respectively provided by a generator, the two generators are fixed on opposite sides within a wind blade ring, the wind blade ring and a stator are connected in a rotatable way by a plurality of rolling elements, and the circumference of the wind blade ring is extended along the radial direction a plurality of blades curving in the same direction and extending from the stator.

* * * * *